United States Patent [19]

Daily

[11] Patent Number: 4,949,923
[45] Date of Patent: Aug. 21, 1990

[54] SELF-LEVELING ASSEMBLY FOR AN APPLIANCE

[75] Inventor: Thomas E. Daily, Herrin, Ill.

[73] Assignee: Maytag Corporation, Newton, Iowa

[21] Appl. No.: 381,186

[22] Filed: Jul. 18, 1989

[51] Int. Cl.⁵ .......................................... F16M 11/24
[52] U.S. Cl. .................................................. 248/188.3
[58] Field of Search ............ 248/649, 650, 677, 188.2, 248/188.3, 188.5, 188.8

[56] References Cited

U.S. PATENT DOCUMENTS

| 1,907,754 | 5/1933 | Dina | 248/649 |
| 2,540,750 | 2/1951 | Morrison | 248/650 |
| 2,695,147 | 11/1954 | Castricone | 248/649 |

FOREIGN PATENT DOCUMENTS 283045  1/1971  U.S.S.R. ........................... 248/188.3

*Primary Examiner*—Ramon O. Ramirez
*Assistant Examiner*—Robert A. Olson
*Attorney, Agent, or Firm*—Bacon & Thomas

[57] ABSTRACT

The rear support legs of a washing machine is automatically adjusted to compensate for unevenness in a support surface and place the machine in a stable position of operation by an assembly including a stabilizer bar provided with channel portions at its opposite ends disposed within bracket housings. The rear legs are slidably received through the bracket housings and channel portions for vertical movement, with each leg being provided with outwardly extending pins engaged within upwardly converging slots of a corresponding channel portion to floatingly secure the stabilizer bar to the bracket housings.

14 Claims, 2 Drawing Sheets

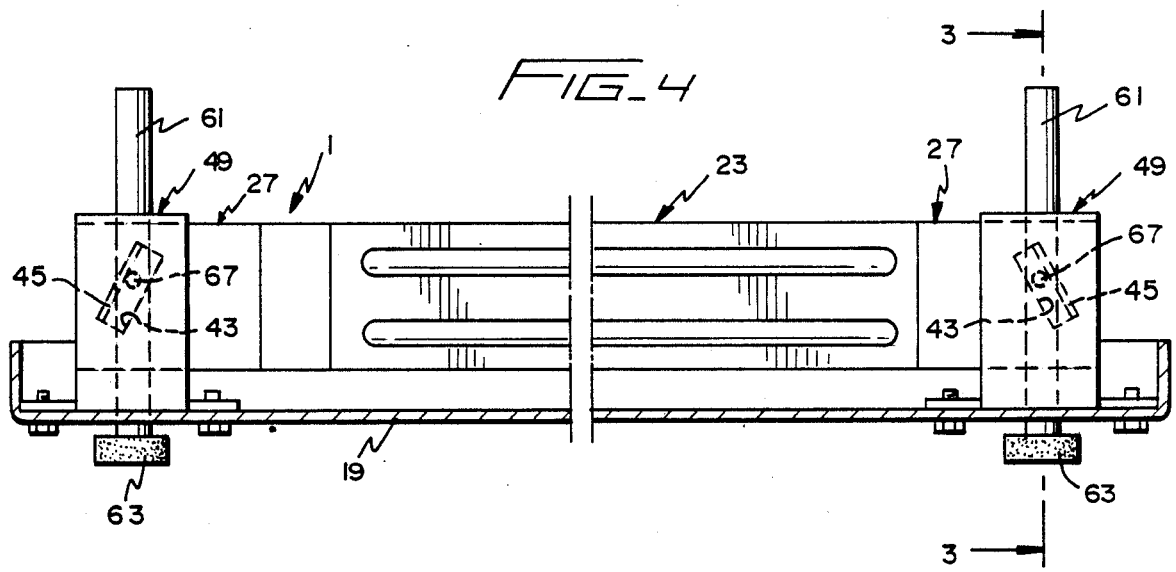
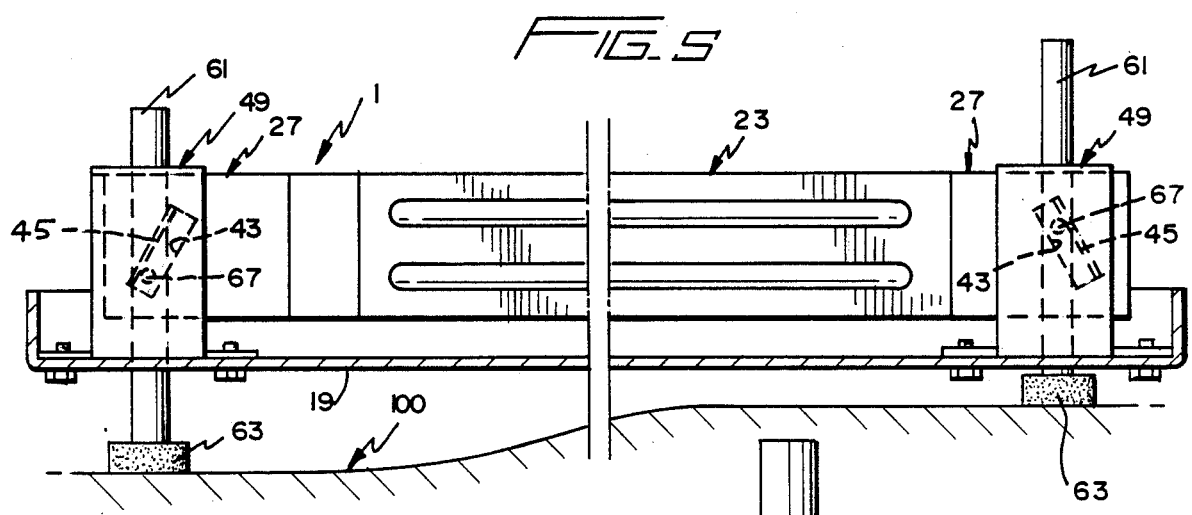
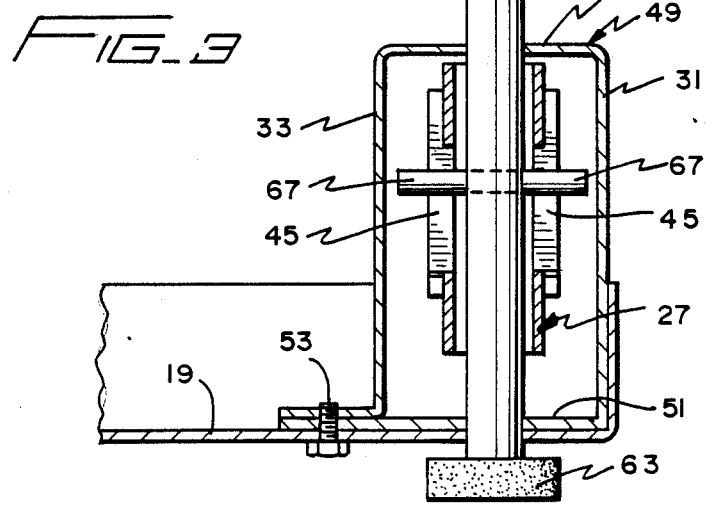

SELF-LEVELING ASSEMBLY FOR AN APPLIANCE

BACKGROUND OF THE INVENTION

1. Field of the Invention

The present invention generally involves the field of technology relating to self-leveling support devices for heavy machinery and appliances. More specifically, the invention pertains to an improved self-leveling assembly for domestic appliances, and particularly for the rear pair of corner support legs of an automatic washing machine disposed on an uneven support surface.

2. Description of the Prior Art

It is known to provide devices and assemblies for realizing the self-leveling of a heavy piece of machinery or appliance so that uneven weight loading can be redistributed on an uneven support surface This is particularly important in certain machines and appliances which produce strong vibrations and therefore require stable and level support during their operation.

A domestic automatic washing machine, for example, is often installed on a basement or utility room floor that is intentionally sloped to provide for proper drainage. Since the machine requires support at each of the four corners of its base, it is necessary to adjust the length of each leg at each corner in order to accommodate the unevenness of the support surface and dispose the machine in a level and stable position for proper operation. This is especially important during the spin cycle of the machine wherein strong vibrating forces are quite high and will cause the machine to shake or move if it is not properly and evenly supported at its four corners.

A washing machine is typically installed with its rear portion adjacent a back wall, and often with other appliances, such as a dryer, and possibly a side wall positioned adjacent the side portions of the machine. Such an installation does not interfere with adjustment of the front two legs of the machine since these legs are easily accessible and leveled through simple screw adjustments. However, because the rear portion of the machine is inaccessible after installation, a self-leveling means must be provided to permit automatic adjustment of the two rear legs.

Conventional self-leveling devices and assemblies for washing machines generally involve interconnecting the two rear legs together by a center bar section to create a rigid unit which is then secured to the machine frame by means of stationary brackets provided with angled slots in the walls thereof, with pins carried by the legs being disposed in sliding engagement through the slots. The self-leveling function is realized through the interconnection of the rear legs by the center bar section so that as one leg is retracted, the other leg is automatically extended. When the machine is disposed on a support surface that slopes downwardly toward one side or the other of the machine, the rear legs will remain in contact with the floor and support of the machine at both rear corners is established by the pins being engaged against the edges of the slots under static friction.

Because of the rigid connection of the center section and the two rear legs, adjustment requires tilting of the center section from the horizontal in a direction corresponding to the retraction and extension of each leg, so that the entire supporting force is sustained at the frictional engagement points defined by the pins and edges of the slots. An arrangement of this type is disadvantageous in that tilting of the center bar section necessarily results in corresponding tilting of the legs from the vertical because of the rigid connection therebetween. If the unevenness in the support surface is minimum and the degree of self-leveling adjustment is low, the tilting of the legs from their respective vertical orientations may not be sufficiently pronounced to affect stability of their support function. However, if the degree of adjustment is high, then it is apparent that the more extended leg will experience pronounced tilting which could adversely affect the stability of the machine during its operation.

SUMMARY OF THE INVENTION

It is an object of the present invention to provide an improved self-leveling assembly for an appliance.

It is another object of the invention to provide an improved self-leveling assembly for the pair of rear corner legs of a machine or appliance, and particularly a domestic automatic washing machine.

It is a further object of the invention to provide an improved self-leveling assembly capable of permitting the automatic self-leveling of the rear legs of an appliance to compensate for unevenness in a support surface on which the appliance is disposed through independent extension and retraction of the legs in vertical directions to impart a high degree of stability to the appliance under high torsional forces and during its operation.

It is still an object of the invention to provide an improved self-leveling assembly for a machine or appliance wherein the assembly is extremely simple in construction, economical to manufacture and reliable in use.

These and other objects of the invention are realized by providing a self-leveling assembly which includes a pair of bracket housings secured to the upper surface of an appliance base panel and positioned at the rearward two corners thereof. A stabilizer bar, provided with a channel-shaped portion partially defined by a pair of spaced walls at each end thereof, extends between the bracket housings, with a channel portion disposed in a corresponding housing. A leg is freely supported through aligned apertures provided in the base panel and both top and bottom walls of each bracket housing. Each leg is provided with a pair of laterally extending pins at approximately its midsection, with the pins being disposed in a pair of longitudinal slots formed in the spaced walls of a corresponding channel portion. The channel portions of the stabilizer bar and the legs are captured within the bracket housings, with the bar being secured for free floating movement with respect to the legs and the legs being secured for vertical movement only within their respective aligned apertures.

Other objects, features and advantages of the invention shall become apparent from the following detailed description of a preferred embodiment thereof, when taken in conjunction with the drawings wherein like reference characters refer to corresponding parts in the several views.

BRIEF DESCRIPTION OF THE DRAWINGS

FIG. 3 is a cross-sectional view taken along the line 3—3 in FIG. 4.

FIG. 4 is a front elevational view, partly in section, showing the self-leveling assembly with the legs of the appliance in a substantially fully retracted or stored position for shipping the appliance.

FIG. 5 is a front elevational view, partly in section, showing the self-leveling assembly in a position of automatic adjustment after the appliance has been installed on an uneven support surface.

DETAILED DESCRIPTION OF THE PREFERRED EMBODIMENT

Figure 1:
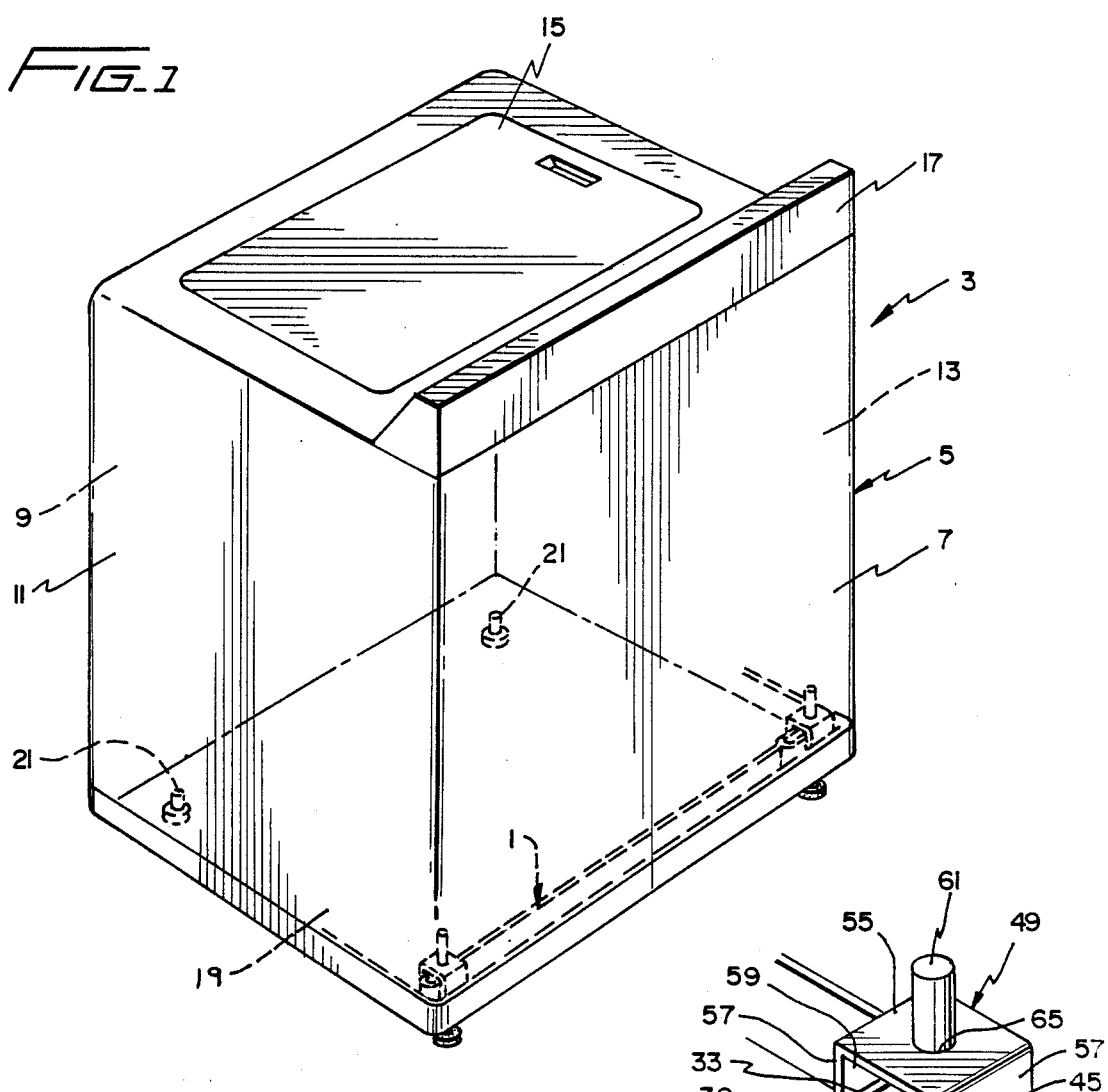
FIG. 1 is a perspective view of an appliance cabinet, and depicting in phantom lines the installation of a self-leveling assembly according to a preferred embodiment of the invention.

A self-leveling assembly 1, according to a preferred embodiment of the invention is shown in phantom lines installed at the rear bottom portion of an appliance 3. For example, appliance 3 is generally depicted as including a cabinet 5 for housing the internal components of an automatic washing machine. Cabinet 5 is essentially defined by a rear wall 7, a front wall 9 and a pair of opposed side walls 11 and 13. The top portion of cabinet 5 is provided with a hinged closure lid 15 and a rearwardly disposed control panel 17. The bottom portion of cabinet 5 includes a base panel 19 of any suitable configuration for mounting and supporting the internal components of the machine.

Cabinet 5 is of a substantially rectangular configuration, and is supported on a floor or similar support surface at the four corners of base panel 19. The two front corners of base panel 19 are provided with a pair of conventional screw adjustable leg assemblies 21, with each assembly 21 typically including a threaded shaft engaged through a correspondingly threaded nut secured to base panel 19, and the exterior end of the threaded shaft being provided with an appropriate foot pad for engaging the support surface. The two rear corners of base panel 19 are supported by assembly 1 according to the invention and in a manner to be hereinafter detailed.

Figure 2:
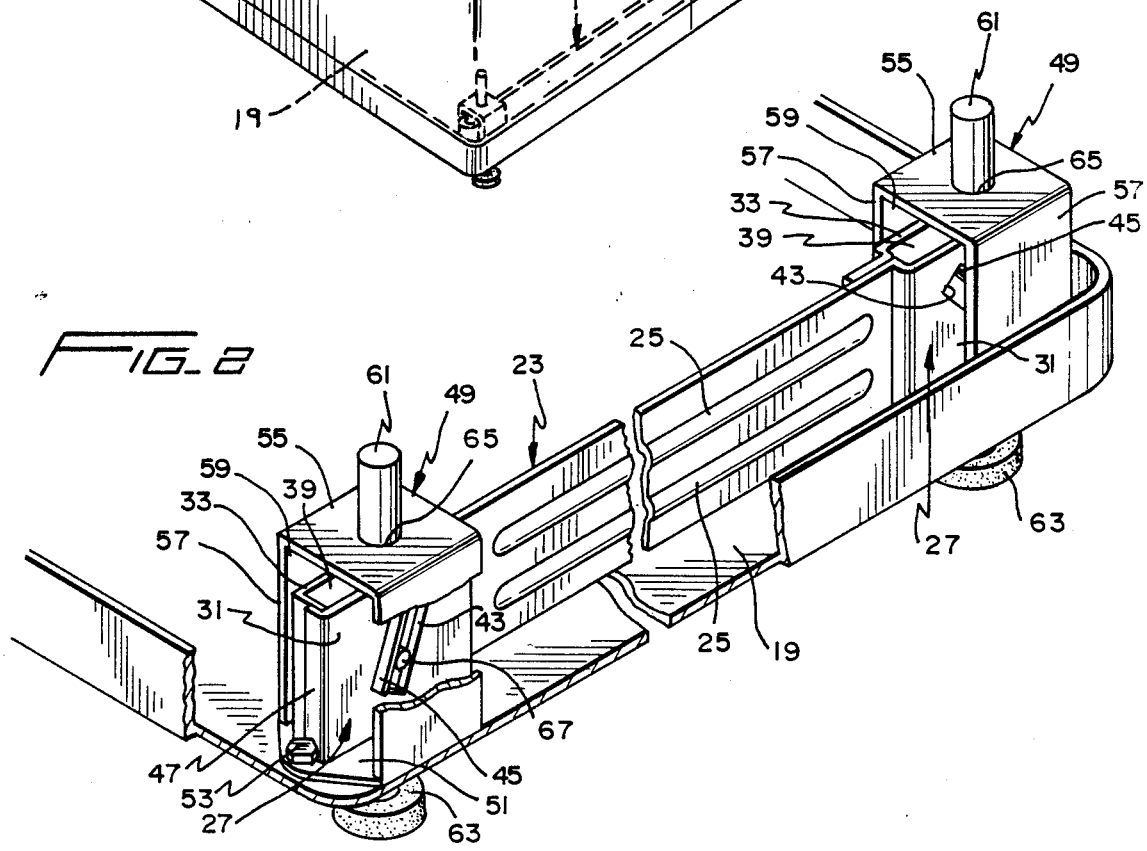
FIG. 2 is a partial perspective view of the self-leveling assembly shown installed on the base panel of an appliance, and particularly depicting the manner in which the stabilizer bar is secured to the rear legs and bracket housings for free floating movement.

With reference to FIGS. 2 and 3, assembly 1 is shown installed on the upper surface and bridges the two rearward corners of base panel 19. Assembly 1 includes an elongate stabilizer bar 23 that is preferably formed from sheet metal and provided with a plurality of longitudinal ribs 25 therein for enhanced rigidity and strength. The opposite ends of bar 23 are formed into enlarged channel portions 27. Each channel portion 27 is partially defined by a pair of spaced vertical walls 31 and 33 which form a substantially rectangular-shaped open-ended cavity 39 therethrough. As also indicated in FIG. 2, vertical walls 31 and 33 of channel portions 27 are each provided with an elongate slot 43 formed therein. The upper edge of each slot 43 is provided with an outwardly extending longitudinal flange 45 for defining a bearing surface. When assembly 1 is installed in a position of use, as shown in FIG. 2, the two pairs of longitudinal axes of slots 43 extend upwardly and converge inwardly. Although only a single slot 43 is shown in wall 31 of each channel portion 27, it is understood that an opposing slot is also provided in each wall 33. As also shown in FIG. 2, the outward edges of walls 31 and 33 of each channel portion 27 may be bent inwardly at right angles and overlapped to form an end wall 47. Bar 23 may be integrally formed from a single sheet of metal or from plural parts secured together, by welding or the like, to form a rigid and unitized structure.

Assembly 1 further includes a pair of bracket housings 49 disposed at each rear corner of base panel 19. Each housing 49 includes a bottom wall 51 which is rigidly attached to the top surface of base panel 19 by a plurality of appropriate mechanical fasteners 53, a top wall 55 and a pair of opposed side walls 57. It is preferred that housing 49 be formed from a single sheet of metal. As shown, housings 49 are rigidly secured in a stationary manner to the rear corners of base panel 19. Each housing 49 also defines a substantially rectangular-shaped open-ended cavity 59 therethrough.

Assembly 1 is also provided with a pair of legs 61, with each leg 61 being preferably in the form of a cylindrical metal shaft having an appropriate foot pad 63 attached to its bottom end. Each leg 61 is disposed through a pair of aligned apertures formed in base panel 19 and bottom wall 51 of each bracket housing 49, cavity 39 of a corresponding channel portion 27, and an aperture 65 formed in top wall 55 of each bracket housing 49. Each leg 61 is secured for free slideable movement in a vertical direction within bracket housing 49 by a pair of pins 67 which extend laterally outwardly from both sides of leg 61 at approximately its midsection and disposed through corresponding slots 43 in vertical walls 31 and 33.

It is therefore apparent from the aforedescribed arrangement that stabilizer bar 23 has its channel portions 27 captured within cavities 59 of bracket housings 49 for free floating movement with respect to legs 61. The release of legs 61 from brackets 49 and base panel 19 is prevented by the engagement of pins 67 in their corresponding pairs of slots 43. Since bracket housings 49 are rigidly secured to base panel 19 in a stationary manner, each leg 61 is restricted to movement only in a vertical direction along its longitudinal axis. Moreover, legs are also permitted to extend and retract with respect to base panel 19 in an independent manner to the extent that legs 61 are not rigidly connected to stabilizer bar 23. This independent vertical movement of legs 61 causes pins 67 to engage flanges 45 of slots 43 and thereby shift bar 23 laterally in a horizontal direction and cause engagement of channel portions 27 against top walls 55 of bracket housings 49.

The manner in which assembly 1 is utilized to automatically level and stabilize appliance 3 in its installed position of operation shall now be described with reference to FIGS. 4 and 5.

As first shown in FIG. 4, assembly 1 is disposed in a stored position for facilitating the packing, shipping and storing of appliance 3. In this position, legs 61 are each substantially fully retracted into cabinet 5, with foot pads 63 extending outwardly for equal distances and substantially to the same extent as the corresponding foot pads of front legs 21 when the latter are in their fully retracted positions. This serves to dispose stabilizer bar 23 in parallel with base panel 19, the upper edges of channel portions 27 in engagement against top walls 55 of brackets 49 and pins 67 against flanges 45. Appropriate fasteners or securing means may also be utilized as needed to maintain assembly 1 in this stored position.

As next shown in FIG. 5, assembly 1 is disposed in an adjusted position wherein appliance 3 has become automatically leveled and stabilized after the rearward corners thereof have been installed on an uneven support surface 100. In this position, it shall be noted that stabilizer bar 23 is also disposed parallel to base panel 19 and raised vertically to the maximum extent wherein the top edges of channel portions 27 are in engagement against top walls 55 of bracket housings 49. As also indicated, pins 67 of both legs 61 are disposed under static frictional engagement against their corresponding flanges 45, thereby maintaining each leg 61 in its respective position of adjustment. Moreover, since the portion of support surface 100 below left leg 61 is lower than that portion below right leg 61, left leg 61 must extend further outwardly from the bottom of base panel 19 in order to compensate for this difference. This disposes pins 67 of left leg 61 in a lower position against flanges 45 of slots 43 than pins 67 of right leg 61, and therefore results in a corresponding horizontal shift of stabilizer bar 23 towards right leg 61. Thus, depending on the nature and degree of unevenness in support surface 100, legs 61 are permitted to independently extend and retract to compensate for such unevenness while maintaining their respective vertical orientations, and thereby produce corresponding horizontal shifting of bar 23 in either direction. Despite severe degrees of unevenness in support surface 100 wherein legs 61 are required to be disposed in fully retracted and fully extended positions, it shall be noted that legs 61 always remain vertical along their respective longitudinal axes, thereby providing a high degree of stability to appliance 3 during its operation.

The automatic leveling of appliance 3 by assembly 1 is easily realized by simply positioning appliance 3 in its desired location of installation and legs 61 shall automatically extend or retract as required to compensate for unevenness in support surface 100.

Although assembly 1 has been shown to be particularly advantageous for use in conjunction with an automatic washing machine, it is understood that assembly 1 may also be used with any other type of machinery or appliance requiring the stable and self-leveling support provided by assembly 1.

It is to be further understood that the form of the invention shown and described herein comprises only a preferred embodiment thereof, and that various modifications and changes shall become apparent to one skilled in the art and within the scope of the subjoined claims.

I claim:

1. An assembly for self-leveling an appliance on a support surface comprising:
   (a) a pair of bracket housings for attachment to the base portion of an appliance, each bracket housing including aperture means therethrough and a first cavity;
   (b) a stabilizer bar including two channel portions, each channel portion being receivable in the first cavity of a bracket housing and including elongate slot means and a second cavity; and
   (c) an elongate leg slidably disposed through the aperture means of each bracket housing and the second cavity of a corresponding channel portion, and including frictional engagement means disposable through the elongate slot means of the corresponding channel portion for securing the channel portions and the legs to the bracket housings and permitting free floating movement of the stabilizer bar with respect to the legs.

2. The assembly of claim 1 wherein each bracket housing further includes a top wall and a bottom wall for attachment to the base portion of an appliance, and the aperture means includes aligned apertures formed in the top and bottom walls.

3. The assembly of claim 2 wherein each bracket housing further includes a pair of opposed side walls, with the top, side and bottom walls collectively defining a substantially open-ended rectangular-shaped first cavity.

4. The assembly of claim 1 wherein each channel portion includes a pair of spaced vertical walls and the elongate slot means includes an elongate slot formed in each vertical wall.

5. The assembly of claim 4 wherein the longitudinal axes of the two pairs of slots extend substantially upwardly and converge inwardly when the assembly is disposed in a position of use.

6. The assembly of claim 5 wherein the upper longitudinal edge of each slot includes an outwardly extending longitudinal flange defining a bearing surface engageable by the frictional engagement means.

7. The assembly of claim 4 wherein each channel portion includes an end wall, with the end wall and vertical walls collectively defining a substantially open-ended rectangular-shaped second cavity.

8. The assembly of claim 1 wherein the frictional engagement means of each leg includes at least one outwardly extending pin.

9. The assembly of claim 8 further including a pair of pins extending outwardly from opposite sides of each leg approximately midway between the opposite ends thereof.

10. The assembly of claim 1 wherein each elongate leg includes a foot pad for engaging the support surface.

11. The assembly of claim 1 wherein the bracket housings and stabilizer bar are substantially integrally formed of metal.

12. The assembly of claim 11 wherein the stabilizer bar is formed of sheet metal and further includes a plurality of longitudinal ribs therein between the channel portions.

13. A self-leveling automatic washing machine assembly comprising:
   (a) a substantially rectangular-shaped cabinet for housing the components of an automatic washing machine and including a rectangular-shaped base panel having two front corners and two rear corners;
   (b) a pair of screw adjustable legs secured to the front two corners of the base panel;
   (c) an assembly including a pair of elongate legs disposed at the two rear corners of the base panel;
   (d) the assembly including:
      (i) a bracket housing rigidly secured to each rear corner of the base panel, each housing including a top wall, a bottom wall, aligned aperture means formed through the top and bottom walls, and a first cavity;
      (ii) an elongate stabilizer bar, each end of the bar being provided with a channel portion defined by a pair of spaced walls forming a second cavity, the walls of each channel portion being provided with a pair of opposed elongate slots formed therein, and each channel portion being receivable within the first cavity of a corresponding bracket housing, and
      (iii) each elongate leg slideably received through the aligned aperture means of each bracket housing and the second cavity of a corresponding channel portion for vertical movement along its longitudinal axis, and including a pair of outwardly extending pins disposed through the opposed slots of the corresponding channel portion for securing the channel portions and the legs within the bracket housings and permitting free floating movement of the stabilizer bar with respect to the legs.

14. The assembly of claim 13 wherein the first and second cavities are each of a substantially open-ended rectangular-shaped configuration.

* * * * *